(12) United States Patent
Hung et al.

(10) Patent No.: US 11,095,214 B2
(45) Date of Patent: Aug. 17, 2021

(54) START-UP CIRCUIT AND OPERATION METHOD THEREOF

(71) Applicant: NUVOTON TECHNOLOGY CORPORATION, Hsinchu (TW)

(72) Inventors: Yeh-Tai Hung, Hsinchu (TW); Chung Ming Hsieh, Hsinchu Science Park (TW); Chung-He Li, Hsinchu (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 10 days.

(21) Appl. No.: 16/820,406

(22) Filed: Mar. 16, 2020

(65) Prior Publication Data

US 2021/0075317 A1   Mar. 11, 2021

(30) Foreign Application Priority Data

Sep. 6, 2019 (TW) ................................ 108132340

(51) Int. Cl.
*H02M 3/07* (2006.01)
*H02M 1/36* (2007.01)
*H02M 3/158* (2006.01)

(52) U.S. Cl.
CPC .............. *H02M 3/07* (2013.01); *H02M 1/36* (2013.01); *H02M 3/158* (2013.01); *H02M 3/072* (2021.05)

(58) Field of Classification Search
CPC ........ H02M 3/07; H02M 3/072; H02M 3/158; H02M 1/36
See application file for complete search history.

(56) References Cited

U.S. PATENT DOCUMENTS

| 2015/0207401 A1* | 7/2015 | Zhang ..................... H02M 1/32 323/271 |
| 2016/0118886 A1* | 4/2016 | Zhang ..................... H02M 1/14 323/271 |
| 2019/0207505 A1* | 7/2019 | Ramadass ............. H02M 3/158 |
| 2019/0207519 A1* | 7/2019 | Chakraborty ....... H02M 3/1588 |
| 2020/0021196 A1* | 1/2020 | Scoones ............. H02M 3/1588 |
| 2020/0280256 A1* | 9/2020 | Du ........................ H02M 3/158 |

* cited by examiner

*Primary Examiner* — Jue Zhang
(74) *Attorney, Agent, or Firm* — Muncy, Geissler, Olds & Lowe, P.C.

(57) ABSTRACT

A startup circuit initializes a voltage of a capacitor of a switch-capacitor regulator. The startup circuit includes a voltage forming circuit and a control unit. The voltage forming circuit selectively electrically connected to the top and the bottom of the capacitor. In a first operation phase, the voltage forming circuit is electrically connected to the top and bottom of the capacitor, and the top and bottom of the capacitor are connected to each other, and the voltages of the top and bottom are set as a preset high voltage. In a second operation phase, the voltage forming circuit disconnects the top and the bottom, and generates current flowing out from the bottom of the capacitor until the voltage cross the capacitor is equal to the preset initial voltage. In the third operation phase, the startup circuit is disconnected from the capacitor.

12 Claims, 9 Drawing Sheets

START-UP CIRCUIT AND OPERATION METHOD THEREOF

CROSS REFERENCE TO RELATED APPLICATION

This application claims the priority benefit of Taiwan application no. 108132340, filed on Sep. 6, 2019. The entirety of the above-mentioned patent application is hereby incorporated by reference herein and made a part of this specification.

BACKGROUND OF THE INVENTION

Field of the Invention

The present invention relates to a startup circuit, more particularly to a startup circuit which is able to initialize a voltage cross a top and a bottom of a capacitor of a switch-capacitor regulator to be a preset initial voltage.

Description of the Related Art

In recent years, because of high conversion efficiency, more and more chips use switch-capacitor regulators. When the switch-capacitor regulator starts to operate, it requires an initial voltage across the capacitor. For example, a three-level buck converter requires the voltage cross a fly capacitor thereof to be a half of an input voltage VIN, that is, 0.5 VIN.

In order to reduce on-resistance of circuit, most switch-capacitor regulators, such as third-level buck converters, use low-voltage components, but this design requires that the initial voltage across the capacitor must be accurate, and inaccurate initial voltage may result in damage to the low-voltage components. In order to make the capacitor have an accurate initial voltage after the switch-capacitor regulator circuit is powered on, the switch-capacitor regulator may have to supply a large current to charge the capacitor at the initial stage, but this operation may cause inrush current to damage the chip.

SUMMARY OF THE INVENTION

An objective of the present invention is to provide a startup circuit, so as to solve the aforementioned conventional problems.

In order to achieve the objective, the present invention provides a startup circuit adapted to a switch-capacitor regulator comprising a capacitor, and the startup circuit can initialize a voltage cross a top and a bottom of the capacitor to be a preset initial voltage. The startup circuit includes a voltage forming circuit and a control unit. The voltage forming circuit is selectively electrically connected to the top and the bottom of the capacitor. In a first operation phase, the control unit controls the voltage forming circuit to electrically connect to the top and the bottom of the capacitor, and electrically connect the top of the capacitor to the bottom of the capacitor and set voltages of the top and the bottom of the capacitor to be the preset initial voltage, wherein in the second operation phase, the control unit controls the voltage forming circuit to disconnect the top of the capacitor from the bottom of the capacitor and generate a current flowing out from the bottom of the capacitor until the voltage cross the top and the bottom of the capacitor is equal to the preset initial voltage, wherein in a third operation phase, the control unit controls the voltage forming circuit to disconnect from the top and the bottom of the capacitor.

According to an embodiment, the voltage forming circuit comprises a first switch, a second switch, a third switch, a fourth switch, a voltage divider, a current mirror circuit and a current source. The current source generates the current, the current mirror circuit is coupled to the current source and generates a mirrored current according to the current. The voltage divider comprises a first terminal configured to receive a supply voltage, and a second terminal configured to output a divided voltage, and a third terminal electrically connected to a terminal of the fourth switch, and other terminal of the fourth switch is electrically connected to a low-voltage terminal. The first switch has a terminal electrically connected to the top of the capacitor, and other terminal electrically connected to the second terminal of the voltage divider, and the third switch has a terminal electrically connected to the bottom of the capacitor, and other terminal electrically connected to the current mirror circuit. The second switch has a terminal electrically connected to the top of the capacitor, and other terminal electrically connected to the bottom of the capacitor.

According to an embodiment, in the first operation phase, the control unit turns on the first switch, the second switch and the fourth switch, and turns off the third switch, so that the voltages of the top and the bottom of the capacitor are equal to the divided voltage.

According to an embodiment, in the second operation phase, the control unit turns on the first switch, the third switch and the fourth switch, and turns off the second switch, so that the mirrored current is flowed out from the bottom of the capacitor, to decrease the voltage of the bottom of the capacitor.

According to an embodiment, in the third operation phase, the control unit turns off the first switch, the second switch, the third switch and the fourth switch.

According to an embodiment, the startup circuit further includes a comparator circuit, and in the first operation phase, the comparator circuit receives the voltage of the top of the capacitor, and when the comparator circuit determine that the voltage of the top of the capacitor is higher than or equal to the preset high voltage, the comparator circuit outputs a first trigger signal to the control unit, and the control unit enters the second operation phase upon receipt of the first trigger signal.

According to an embodiment, in the second operation phase, the comparator circuit receives the voltage of the bottom of the capacitor, and when the comparator circuit determines that the voltage of the bottom of the capacitor is equal to a preset low voltage, the comparator circuit outputs a second trigger signal to the control unit, and the control unit enters the third operation phase upon receipt of the second trigger signal, wherein the preset initial voltage is equal to a voltage difference between the preset high voltage and the preset low voltage.

According to an embodiment, the startup circuit further includes a voltage detection circuit configured to compare a supply voltage and a voltage threshold, wherein when the supply voltage is higher than or equal to the voltage threshold, the voltage detection circuit outputs a power-stable signal to the comparator circuit, to trigger the comparator circuit to start comparing the voltage of the top of the capacitor and the preset high voltage.

According to an embodiment, the switch-capacitor regulator is a three-level buck convertor, and the three-level buck convertor comprises a balance circuit, and the voltage forming circuit comprise a fifth switch coupled between the balance circuit and the top of the capacitor, and in the first operation phase and the second operation phase, the control unit turns off the fifth switch, and in the third operation phase, the control unit turns on the fifth switch.

In order to achieve the objective, the present invention provides an operation method of a startup circuit, and the startup circuit can initialize a voltage cross between the top and the bottom of the capacitor of a switch-capacitor regulator to be a preset initial voltage. The operation method comprises steps of: electrically connecting the top of the capacitor to the bottom of the capacitor, and setting voltages of the top and the bottom of the capacitor to be a preset high voltage; disconnecting the top of the capacitor from the bottom of the capacitor, and generating a current flowing out from the bottom of the capacitor; determining whether the voltage cross the top of the capacitor and the bottom is equal to the preset initial voltage, wherein the preset initial voltage is equal to a voltage difference between the preset high voltage and the preset low voltage; when it is determined that the voltage cross the top of the capacitor and the bottom is equal to the preset initial voltage, stopping the current flowing out from the bottom of the capacitor, and activating the switch-capacitor regulator to operate.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
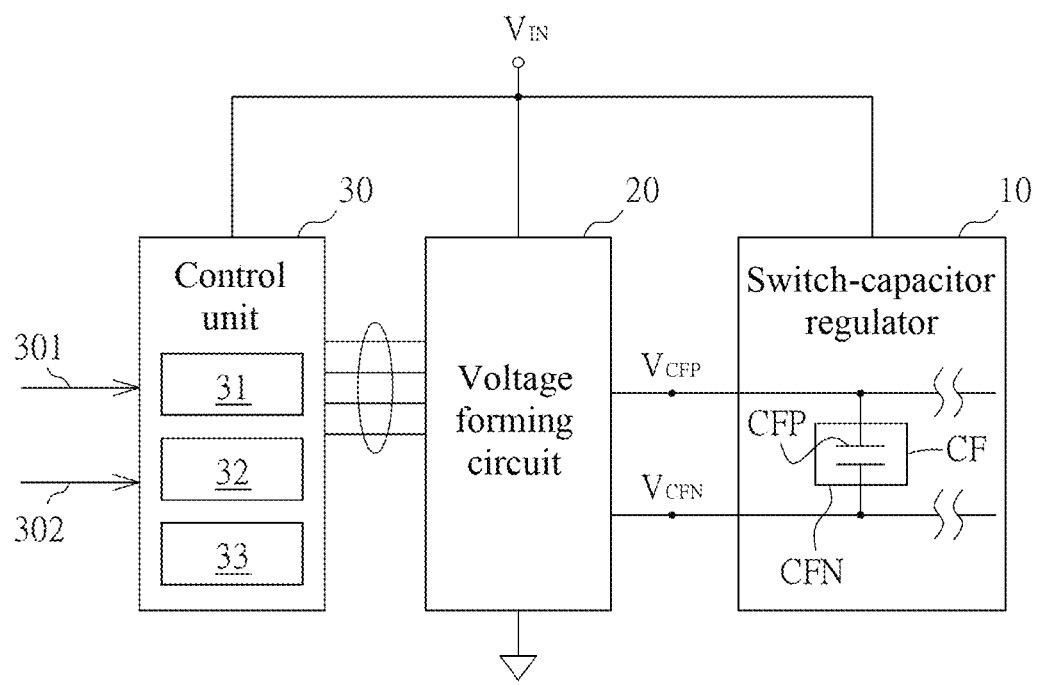
FIG. 1 is a block diagram of a startup circuit of the present invention.

The following disclosure provides many different embodiments, or examples, for implementing different components of the semiconductor devices provided. Specific examples of components and arrangements are described below to simplify the present disclosure. These are, of course, merely examples and are not intended to be limiting. For example, the formation of a first component over or on a second component in the description that follows may include embodiments in which the first and second components are formed in direct contact, and may also include embodiments in which additional components may be formed between the first and second components, such that the first and second components may not be in direct contact. In addition, the present invention may repeat reference numerals and/or letters in the various embodiments. This repetition is for the purpose of simplicity and clarity and does not in itself dictate a relationship between the various embodiments and/or configurations discussed.

Some embodiments are described below. Throughout the various figures and illustrative embodiments, like reference numbers are used to designate like elements. It should be understood that additional operations can be provided before, during, and after the method, and some of the operations described can be replaced or eliminated for other embodiments of the method.

Please refer to FIG. 1, which is a block diagram of a startup circuit of the present invention. As shown in FIG. 1, the startup circuit is applicable to a switch-capacitor regulator 10, such as a three-level buck convertor. The switch-capacitor regulator 10 can comprise a capacitor CF, and the startup circuit is configured to initialize a voltage cross a top CFP and a bottom CFN of the capacitor CF to be preset initial voltage, such as a half of an input voltage or a supply voltage. The startup circuit can comprise a voltage forming circuit 20 and a control unit 30.

The voltage forming circuit 20 is selectively electrically connected to the top CFP and the bottom CFN of the capacitor CF. In an embodiment, the voltage forming circuit 20 comprises a plurality of switches, a voltage source and a current mirror circuit, and the connections and operations of these components will be described in detail in following paragraphs.

The control unit 30 can have at least three operation phases including a first operation phase 31, a second operation phase 32 and a third operation phase 33. In the first operation phase 31, the control unit 30 controls the voltage forming circuit 20 to electrically connect to the top CFP and the bottom CFN of the capacitor CF, and electrically connect the top CFP and the bottom CFN of the capacitor CF to each other, and then set the voltage of the top CFP and the bottom CFN of the capacitor CF to be the preset high voltage. Since the top CFP and the bottom CFN are electrically connected to each other, other components of the voltage forming circuit 20 detects absence of the capacitor CF, and it indicates that the voltage forming circuit 20 can quickly change the voltages of the top CFP and the bottom CFN without being affected by the capacitor CF; for example, the voltage forming circuit 20 can increase the voltages of the top CFP and the bottom CFN by 3.6V/1 uS, and during the process of rising voltage, the capacitor CF can be quickly charged without using large current, thereby preventing from occurrence of inrush current.

In the second operation phase 32, the control unit 30 controls the voltage forming circuit 20 to disconnect the top CFP from the bottom CFN and then generate a current flowing out from the bottom CFN of the capacitor CF until the voltage cross the top CFP and the bottom CFN of the capacitor CF is equal to the preset initial voltage.

When the current flows out from the bottom CFN of the capacitor CF, the voltage of the bottom CFN of the capacitor CF decreases. Furthermore, when the current flows out from the bottom CFN of the capacitor CF, the voltage of the top CFP of the capacitor CF can be held at the preset high voltage formed in the first operation phase as long as there is a current flowing into the top CFP of the capacitor CF.

In the third operation phase 33, the control unit 30 controls the voltage forming circuit 20 to disconnect from the top CFP and the bottom CFN of the capacitor CF. For example, when the voltage of the bottom CFN of the capacitor CF decreases to a preset low voltage, such as 0V, the voltage difference between the top CFP and the bottom CFN of the capacitor CF can be equal to the preset initial voltage which is a voltage difference between the preset high voltage and the preset low voltage, and it indicates that the switch-capacitor regulator 10 can start to operate, so the control unit 30 disconnects the voltage forming circuit 20 from the top CFP and bottom CFN of the capacitor CF, thereby holding the voltage difference between the top CFP and the bottom CFN of the capacitor CF as the preset initial voltage.

According to aforementioned content, the startup circuit of the present invention can quickly rise the voltage of the top CFP of the capacitor CF, and during the process of rising voltage, the capacitor CF can be charged without using large current, thereby preventing from occurrence of inrush current.

Figure 2:
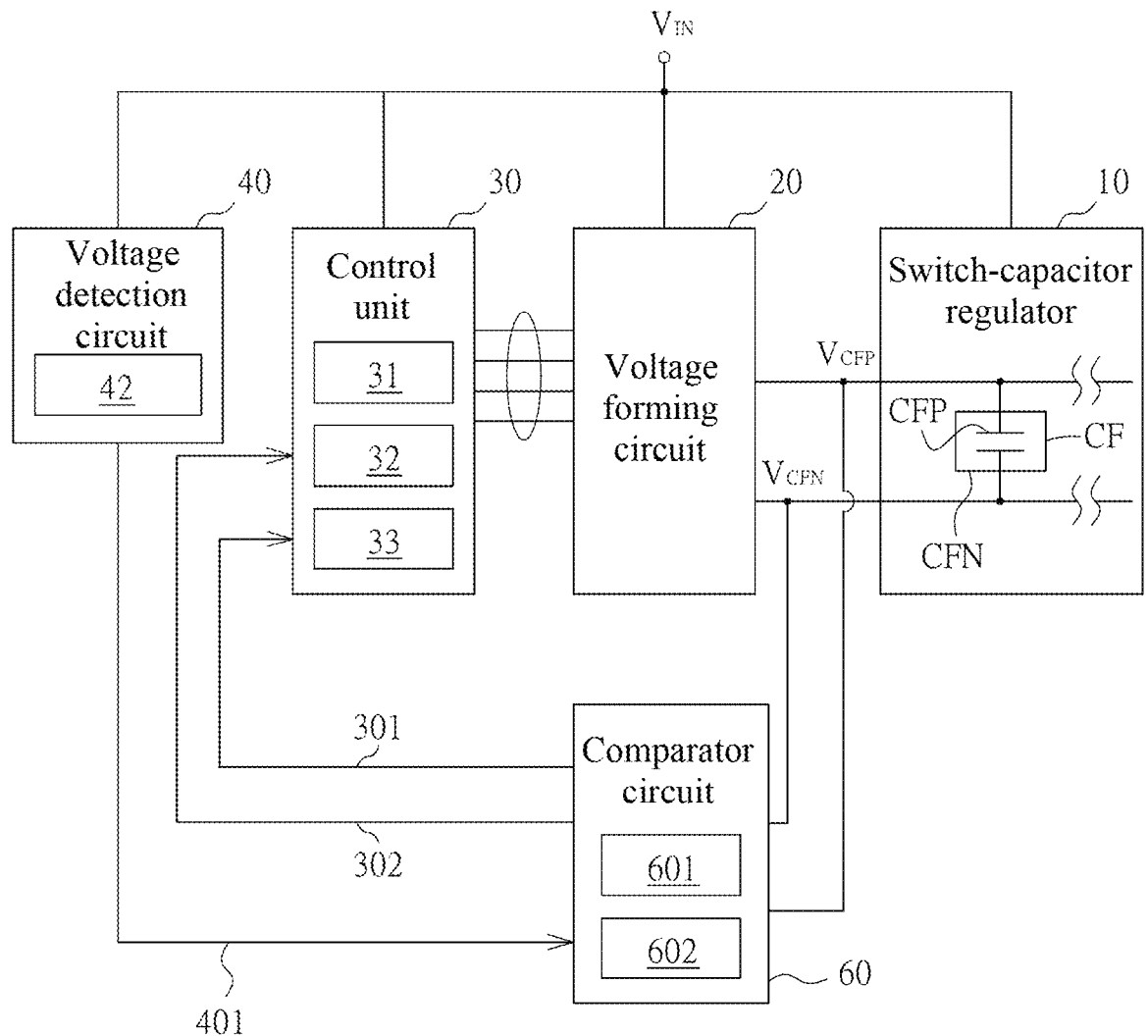
FIG. 2 is a block diagram of an embodiment of a startup circuit of the present invention.

Please refer to FIG. 2, which is block diagram of an embodiment of a startup circuit of the present invention. As shown in FIG. 2, the startup circuit comprises a voltage forming circuit 20, a control unit 30, a comparator circuit 60 and a voltage detection circuit 40. In a first operation phase 31, the control unit 30 controls the voltage forming circuit 20 to electrically connect to the top CFP and the bottom CFN of the capacitor CF, and electrically connect the top CFP and the bottom CFN of the capacitor CF to each other, and set the voltage of the top CFP and the bottom CFN of the capacitor CF to be the preset high voltage 601. When the system is just powered on, the supply voltage is instable or needs more time to reach a preset value, and the preset high voltage 601 is easily affected by stability of the supply voltage, so the comparator circuit 60 can receive the voltage of the top CFP of the capacitor CF, and when the comparator circuit 60 determines that the voltage of the top CFP of the capacitor CF is higher than or equal to the preset high voltage 601, the comparator circuit 60 outputs a first trigger signal 301 to the control unit 30. Upon receipt of the first trigger signal 301, the control unit 30 enters a second operation phase 32.

In the second operation phase 32, the control unit 30 controls the voltage forming circuit 20 to disconnect the top CFP of the capacitor CF from the bottom CFN of the capacitor CF, and generate current flowing out from the bottom CFN of the capacitor CF, so as to drop the voltage of the bottom CFN of the capacitor CF and increase the voltage cross the top CFP and the bottom CFN of the capacitor CF. In this embodiment, the comparator circuit 60 can receive voltages of the top CFP and the bottom CFN of the capacitor CF, and when the comparator circuit 60 determines that the voltage of the bottom CFN of the capacitor CF is lower than or is equal to a preset low voltage, and the comparator circuit 60 also determines the voltage of the top CFP of the capacitor CF is higher than or equal to a preset high voltage, it indicates the voltage cross the top CFP and the bottom CFN of the capacitor CF is equal to the preset initial voltage, the comparator circuit 60 can output a second trigger signal 302 to the control unit 30, so that the control unit 30 enters a third operation phase 33 upon receipt of the second trigger signal 302.

The voltage detection circuit 40 receives a supply voltage VIN, and compares the supply voltage VIN with the voltage threshold 42, and when the supply voltage VIN is higher than or equal to a voltage threshold 42, it indicates that the supply voltage VIN is stable sufficiently, so the voltage detection circuit 40 outputs a power-stable signal 401 to the comparator circuit 60. Upon receipt of the power-stable signal 401, the comparator circuit 60 starts to compare the voltage of the top CFP of the capacitor CF with the preset high voltage 601, to determine whether the control unit 30 enters the second operation phase from the first operation phase. In an embodiment, the power-stable signal 401 can be a power-on reset (POR) signal.

According to aforementioned content, the startup circuit of the present invention can quickly rise the voltage of the top CFP of the capacitor CF, and during the process of rising voltage, the capacitor CF can be charged without using large current, thereby preventing from occurrence of inrush current.

Figure 3:
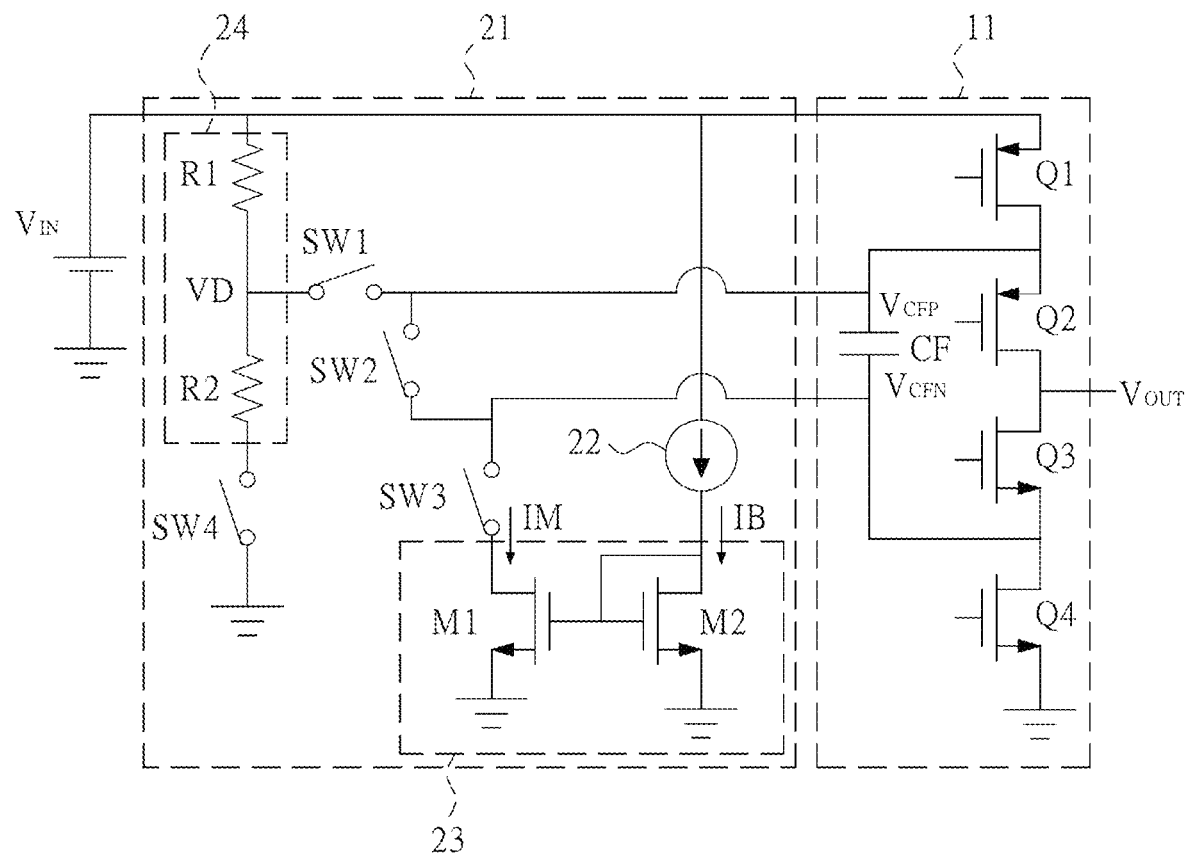
FIG. 3 is a circuit diagram of an embodiment of a voltage forming circuit of the present invention.
Figure 4:
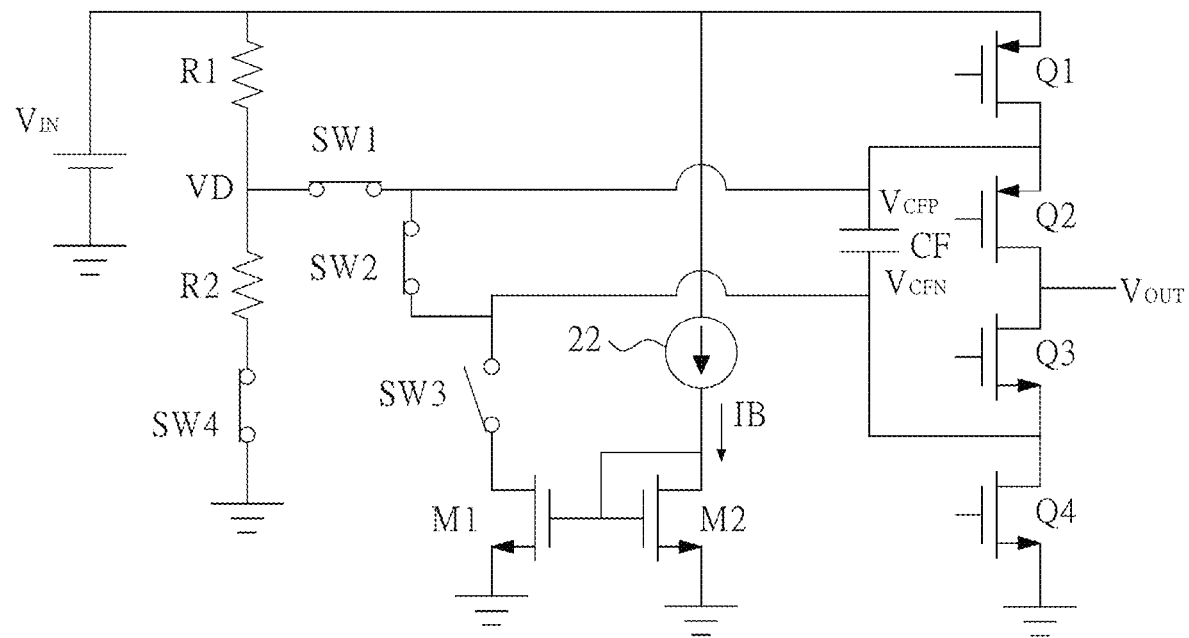
FIG. 4 is a circuit diagram of an embodiment of a voltage forming circuit in a first operation phase, according to the present invention.
Figure 5:
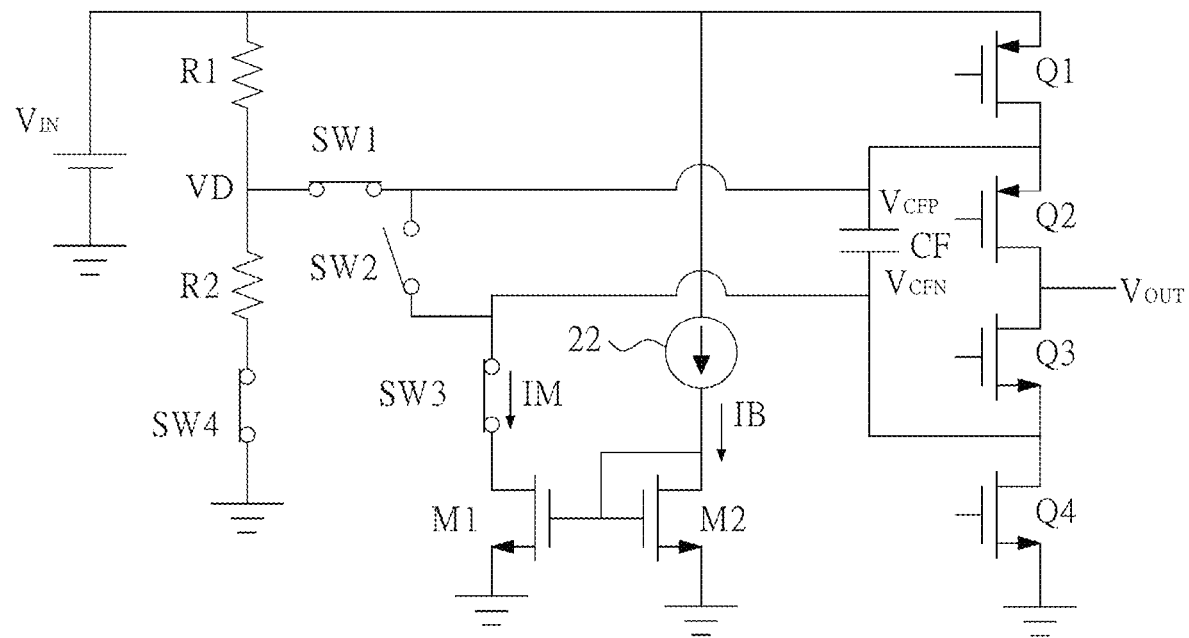
FIG. 5 is a circuit diagram of an embodiment of a voltage forming circuit of a startup circuit in a second operation phase, according to the present invention.

Please refer to FIGS. 3 to 5, which are a circuit diagram of an embodiment of a voltage forming circuit, and circuit diagrams of the voltage forming circuit in a first operation phase and second operation phase, according to the present invention, respectively. In the embodiment of FIG. 3, the switch-capacitor regulator is taken as an example of a three-level buck convertor 11 for illustration. The voltage forming circuit 21 comprises a first switch SW1, a second switch SW2, a third switch SW3, a fourth switch SW4, a voltage divider 24, a current mirror circuit 23 and a current source 22. Please refer to FIG. 5A, which is a signal timing diagram of an embodiment of a voltage forming circuit of a startup circuit of the present invention.

The current source 22 generates a current IB, and the current mirror circuit 23 is coupled to the current source 22 and configured to generate a mirrored current IM according to the current D3. In the embodiment of FIG. 3, the current mirror circuit 23 is implemented by two NMOS transistors M1 and M2; however, the concept of the present invention is not limited thereto.

The voltage divider 24 has a first terminal configured to receive the supply voltage VIN, a second terminal configured to output a divided voltage VD, and a third terminal electrically connected to the terminal of the fourth switch SW4, and the other terminal of the fourth switch SW4 is electrically connected to a low-voltage terminal. In the embodiment of FIG. 3, the voltage divider 24 is implemented by a first resistor R1 and a second resistor R2 connected in series, a terminal of the first resistor R1 serves as the first terminal of the voltage divider 24, and other terminal of the first resistor R1 is electrically connected to a terminal of the second resistor R2 and serves as the second terminal of the voltage divider 24 for outputting the divided voltage VD. The other terminal of the second resistor R2 serves as the third terminal of the voltage divider 24. When resistance of the first resistor R1 is the same as that of the second resistor R2, the divided voltage VD is a half of the supply voltage VIN.

The first switch SW1 has a terminal electrically connected to the top CFP of the capacitor CF, and other terminal electrically connected to the second terminal of the voltage divider 24. The third switch SW3 has a terminal electrically connected to the bottom CFN of the capacitor CF, and other terminal electrically connected to the current mirror circuit 23, as shown in FIG. 3. The other terminal of the third switch SW3 is also connected to drain of the NMOS transistor M1. The second switch SW2 has a terminal electrically connected to the top CFP of the capacitor CF, and other terminal electrically connected to the bottom CFN of the capacitor CF.

As shown in FIG. 4, in the first operation phase 31, the control unit 30 turns on the first switch SW1, the second switch SW2 and the fourth switch SW4, and turn off the third switch SW3, each of the voltages of the top CFP and the bottom CFN of the capacitor CF are equal to the divided voltage VD. When the second switch SW2 is turned on, the top CFP and the bottom CFN are electrically connected to each other, and other components of the voltage forming circuit 21 detect absence of the capacitor CF, so the voltages of the top CFP and the bottom CFN can be quickly risen to the divided voltage VD without being affected by the capacitor CF. As a result, during the process of rising voltage, the capacitor CF can be charged without using large current, so as to prevent from occurrence of inrush current.

In an embodiment, the startup circuit comprises a first comparator having a positive input terminal for receiving voltage of the top CFP of the capacitor CF, and a negative input terminal for receiving the divided voltage VD. When determining that the voltage of the top CFP of the capacitor CF is higher than the divided voltage VD, the first comparator can output a high level signal to the control unit 30, so that the control unit 30 can enter the second operation phase 32.

In the second operation phase 32, as shown in FIG. 5, the control unit 30 turns on the first switch SW1, the third switch SW3 and the fourth switch SW4, and turns off the second switch SW2, so as to disconnect the top CFP of the capacitor CF from the bottom CFN of the capacitor CF, and flow out the mirrored current IM from the bottom CFN of the capacitor CF. thereby decreasing the voltage of the bottom CFN of the capacitor CF. When the current flows out from the bottom CFN of the capacitor CF, the voltage of the top CFP of the capacitor CF can be held at the divided voltage VD as long as there is current flowing into the top CFP of the capacitor CF, such as through the first resistor R1 and the first switch SW1 from the power supply terminal.

In an embodiment, the startup circuit can comprise a second comparator having a positive input terminal which is grounded, and a negative input terminal for receiving the voltage of the bottom CFN of the capacitor CF. When the voltage of the bottom CFN of the capacitor CF is lower than 0V, the first comparator outputs the high level signal to the control unit 30, so as to trigger the control unit 30 to enter the third operation phase 33.

In the third operation phase 33, as shown in FIG. 3, the control unit 30 turns off the first switch SW1, the second switch SW2, the third switch SW3 and the fourth switch SW4. In the second operation phase 32, the voltage of the top CFP of the capacitor CF is held on the divided voltage VD, and the voltage of the bottom CFN of the capacitor CF is held to be just lower than 0V, and it indicates that the voltage cross the top CFP and the bottom CFN of the capacitor CF is substantially equal to the divided voltage VD, that is, the voltage across the capacitor CF reaches the preset initial voltage, so that the control unit 30 disconnects the voltage forming circuit 21 from the capacitor CF, and then notifies the three-level buck convertor 11 to start operation.

Figure 5A:
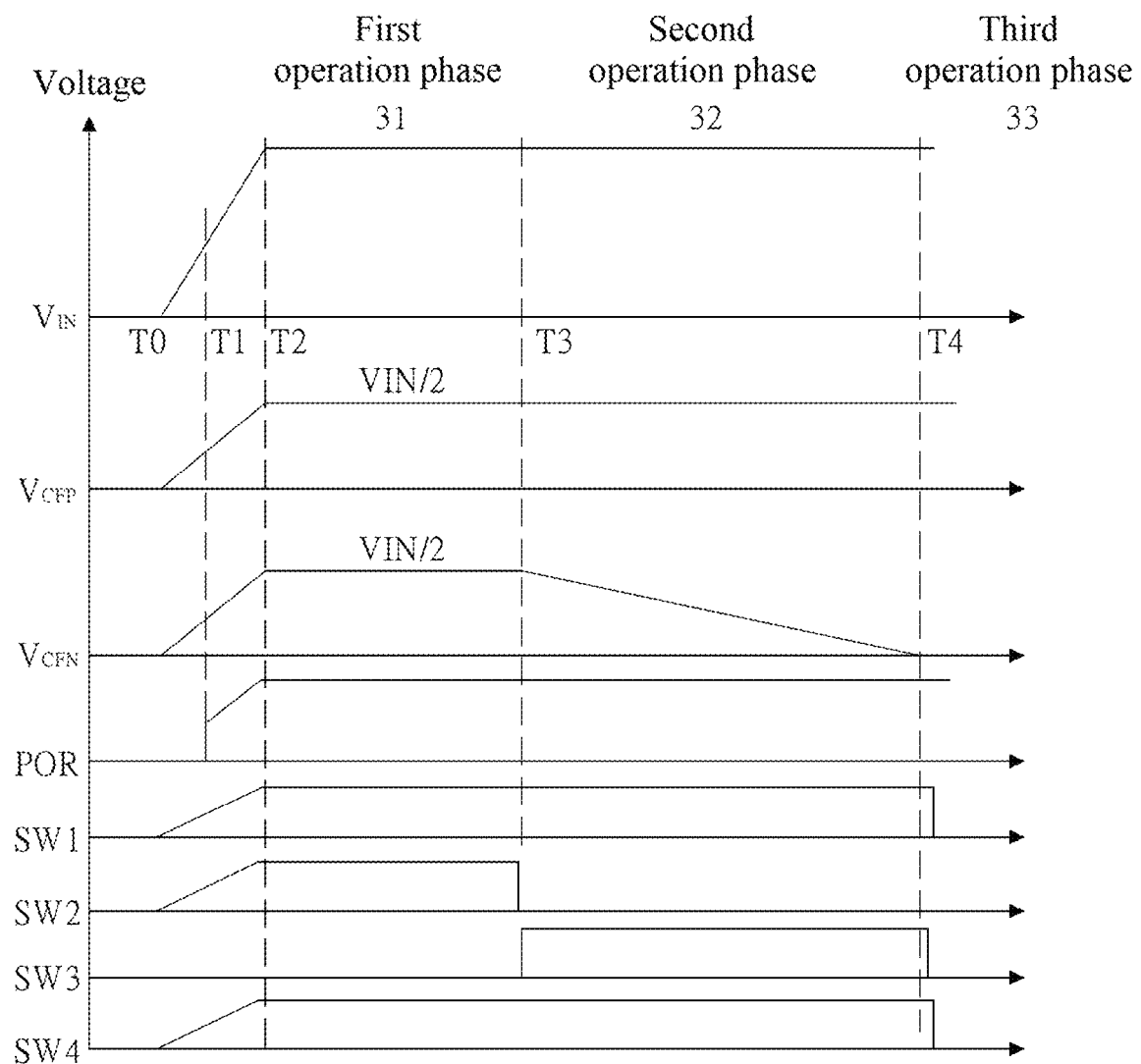
FIG. 5A is a signal timing diagram of an embodiment of a voltage forming circuit of a startup circuit of the present invention.

As shown in FIG. 5A, at a time point T0, the system is powered on and the input voltage VIN starts to rise from 0V, and when the input voltage VIN exceeds the voltage threshold 42, the power-on reset signal POR is generated at a time point T1. Upon receipt of the power-on reset signal POR, the comparator circuit 60 starts to compare the voltage of the top CFP of the capacitor CF with the preset high voltage 601, such as VIN/2 shown in FIG. 5A, at a time point T2. When the comparator circuit 60 determines that the voltage of the top CFP of the capacitor CF is higher than or equal to the preset high voltage 601 for a period, the control unit 30 enters the second operation phase 32 at a time point T3. Next, the voltage of the bottom CFN of the capacitor CF starts to decrease, and the voltage of the top CFP of the capacitor CF is held at VIN/2. When the voltage of the bottom CFN of the capacitor CF is lower than or equal to 0V, for example, at the time point T4, the control unit 30 enters the third operation phase 33.

Figure 6:
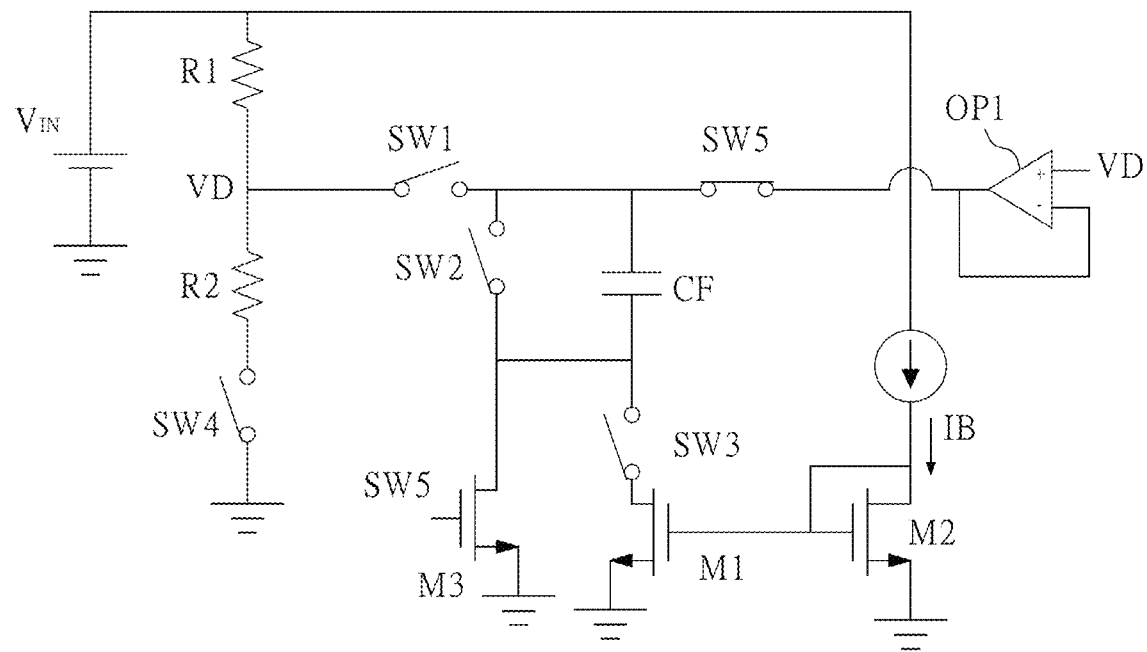
FIG. 6 is a circuit diagram of another embodiment of a voltage forming circuit of a startup circuit of the present invention.

Please refer to FIG. 6, which is a circuit diagram of another embodiment of a voltage forming circuit of the present invention. In this embodiment, the three-level buck convertor 11 can comprise a balance circuit which includes a comparator OP1 and a NMOS transistor M3. When the three-level buck convertor 11 is operated, the balance circuit can maintain the voltage of the top and bottom of the capacitor, so as to prevent the low-voltage device of the three-level buck convertor 11 from being damaged by the instable voltage across of the capacitor CF. The voltage forming circuit 20 can comprise a fifth switch SW5 coupled between the output terminal of the comparator OP1 and the top CFP of the capacitor CF, and the control signal corresponding to the fifth switch SW5 is transmitted to gate of the NMOS transistor M3. Drain of the NMOS transistor M3 is electrically connected to the bottom of the capacitor CF. The positive input terminal of the comparator OP1 receives the divided voltage VD, and the negative input terminal of the comparator OP1 is connected to the output terminal of the comparator OP1.

In the first operation phase 31 and the second operation phase 32, the control unit 30 turns off the fifth switch SW5, so the top CFP of the capacitor CF is not connected to the output terminal of the comparator OP1, and the bottom CFN of the capacitor CF is not grounded. In the third operation phase 33, the control unit 30 turns on the fifth switch SW5, so that the top CFP of the capacitor CF is connected to the output terminal of the comparator OP1, and the bottom CFN of the capacitor CF is grounded.

Figure 7:
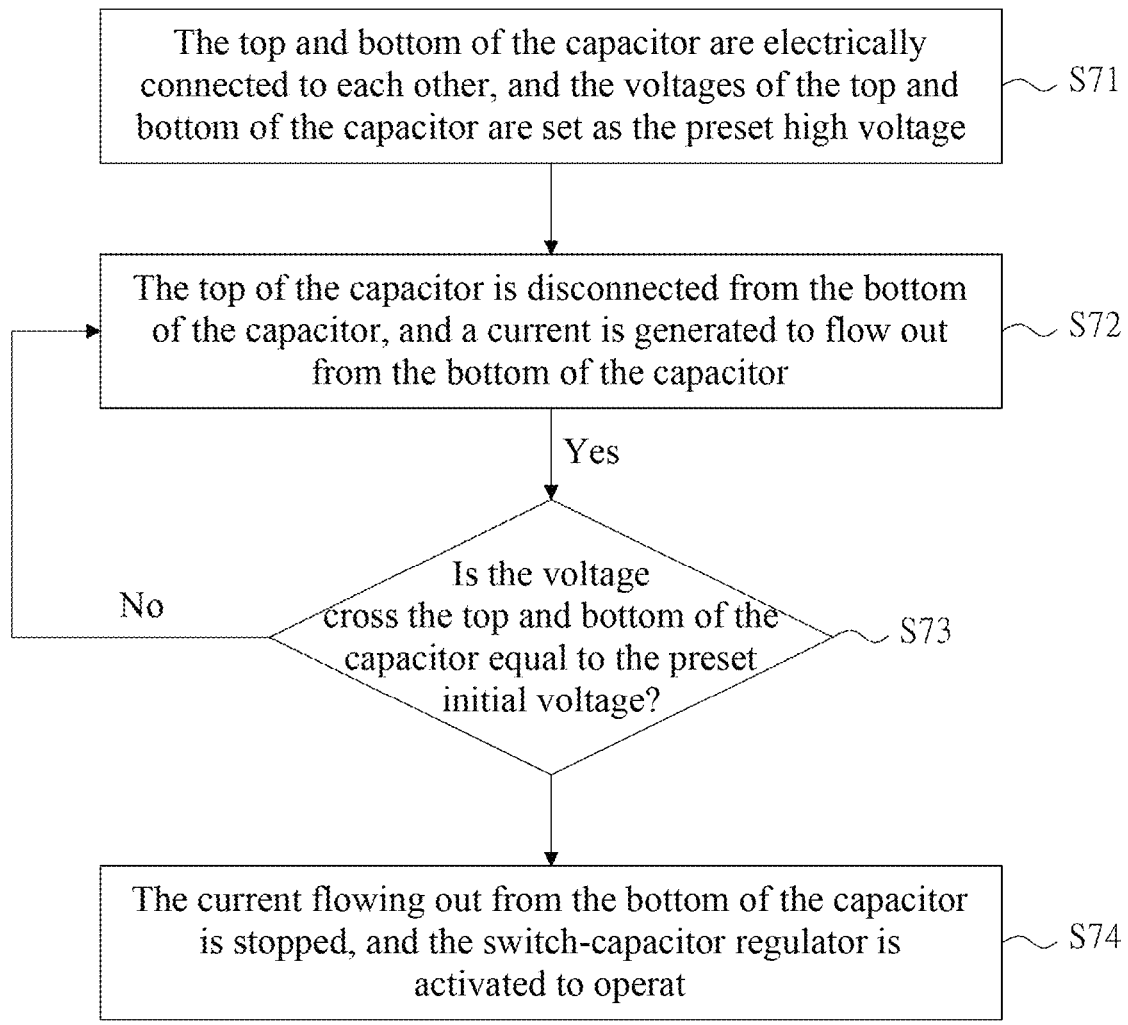
FIG. 7 is a flowchart of an operation method of a startup circuit of the present invention.

Please refer to FIG. 7, which is a flowchart of an operation of an operation method of a startup circuit of the present invention. The operation method is applicable to the startup circuit shown in FIG. 1, to initialize a voltage cross the top and the bottom of the capacitor of the switch-capacitor regulator to be the preset initial voltage. The preset initial voltage is a voltage difference between the preset high voltage and the preset low voltage. The operation method comprises steps S71 to S74. In an embodiment, the switch-capacitor regulator can be a three-level buck convertor.

In a step S71, the top and bottom of the capacitor are electrically connected to each other, and the voltages of the top and bottom of the capacitor are set as the preset high voltage.

In a step S72, the top of the capacitor is disconnected from the bottom of the capacitor, and a current is generated to flow out from the bottom of the capacitor.

In a step S73, it is determined whether the voltage cross the top and bottom of the capacitor is equal to the preset initial voltage. In an embodiment, the step S73 can be implemented by determining whether the voltage of the bottom of the capacitor is lower than the preset low voltage.

In an embodiment, the preset high voltage is a supply voltage of the switch-capacitor regulator, and the preset low voltage is a ground voltage; before step S73, it can be determined whether the supply voltage is stable, for example, it can be determined that the supply voltage is stable when the supply voltage is higher than a voltage threshold; and after the supply voltage is stable, the operation method can proceed the step S73.

In a step S74, when it is determined that the voltage cross the top and bottom of the capacitor is equal to the preset initial voltage, the current flowing out from the bottom of the capacitor is stopped, and the switch-capacitor regulator is activated to operate.

Since the top and bottom of the capacitor is electrically connected to each other in the step S71, the external component detects absence of the capacitor of the switch-capacitor regulator, the voltage of the top and bottom can be risen without being affected by the capacitor CF, and during the process of rising the voltage, the capacitor can be charged without using large current, thereby preventing from occurrence of inrush current.

Figure 8:
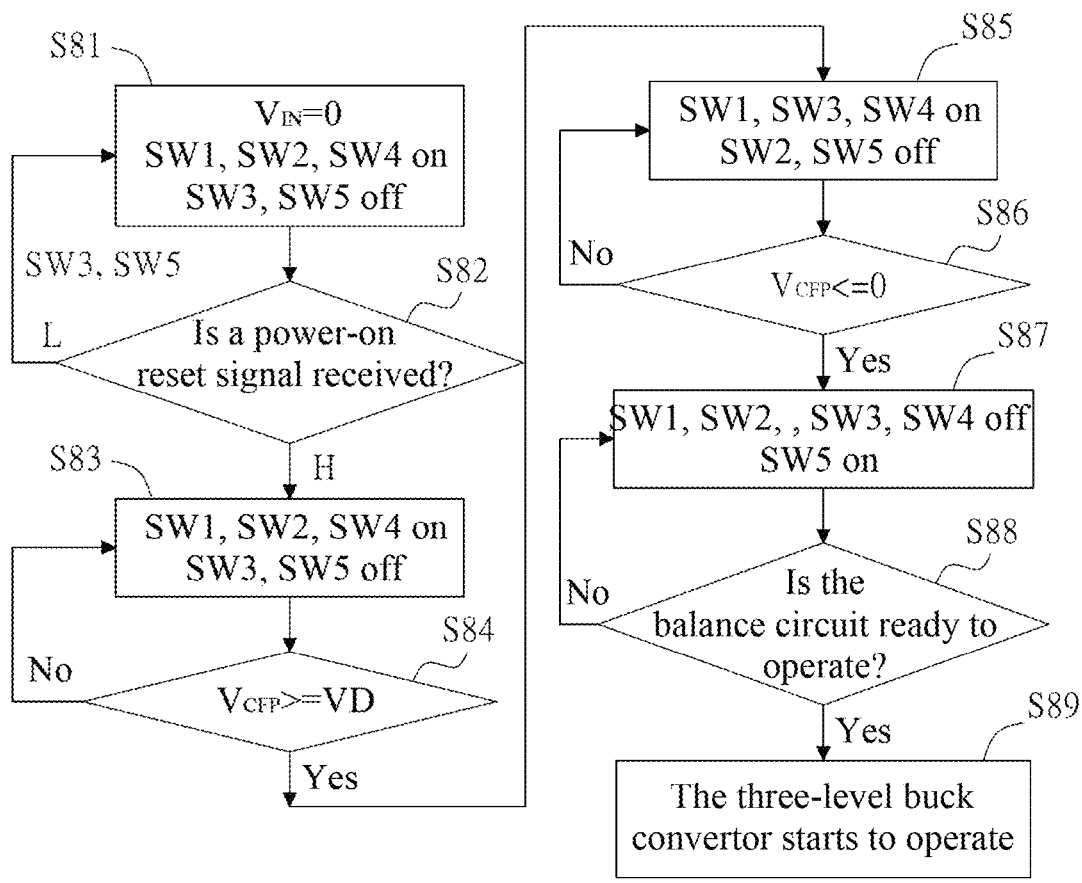
FIG. 8 is a flowchart of an embodiment of an operation method of a startup circuit of the present invention.

Please refer to FIG. 8, which is a flowchart of an embodiment of an operation method of the startup circuit of the present invention. The operation method is applicable to the startup circuit shown in FIG. 3, and the three-level buck convertor 11 comprises the balance circuit, as shown in FIG. 6. The operation method can initialize a voltage cross the top and the bottom of the capacitor CF of the three-level buck convertor 11 to be the preset initial voltage, for example, the divided voltage VD. The operation method comprises steps S81 to S89.

In a step S81, the circuit system is powered on, the supply voltage VIN is 0V initially, and the first switch SW1, the second switch SW2 and the fourth switch SW4 are turned on, the third switch SW3 and the fifth switch SW5 are turned off, and the startup circuit enters the first operation phase.

In a step S82, it is checked whether a power-on reset signal is received. When the power-on reset signal is received, it indicates that the supply voltage VIN is risen to the voltage threshold 42 already, the comparator circuit 60 starts to operate. In an embodiment, the step S82 can be implemented by the voltage detection circuit of FIG. 2.

In a step S83, the startup circuit stays in the first operation phase, the first switch SW1, the second switch SW2 and the fourth switch SW4 are turned on, and the third switch SW3 and the fifth switch SW5 are turned off.

In a step S84, it is determined whether the voltage VCFP of the top CFP of the capacitor CF is higher than or equal to the divided voltage VD. In an embodiment, after the comparator circuit 60 starts to operate, the comparator circuit 60 can determine whether the voltage VCFP of the top CFP of the capacitor CF is higher than or equal to the divided voltage VD. When the voltage VCFP is higher than or equal to the divided voltage VD, a step S85 is performed.

In the step S85, the first switch SW1, the third switch SW3 and the fourth switch SW4 are turned on, and the second switch SW2 and the fifth switch SW5 are turned off, and the startup circuit enters the second operation phase.

In a step S86, it determined whether the voltage VCFN of the bottom CFN of the capacitor CF is lower than or equal to 0V. When the voltage VCFN is lower than or equal to 0V, it indicates that the voltage of the capacitor CF is equal to the divided voltage VD, the step S87 is performed; otherwise, when the voltage VCFN is not lower than or not equal to 0V, the flow return to the step S85.

In the step S87, the first switch SW1, the second switch SW2, the third switch SW3 and the fourth switch SW4 are turned off, and the fifth switch SW5 is turned on, and the balance circuit is electrically connected to the top CFP and the bottom CFN of the capacitor CF.

In a step S88, it is determined whether the balance circuit is ready to operate, and when the balance circuit is ready, a step S89 is performed; otherwise, the step S87 is performed.

In the step S89, the three-level buck convertor 11 starts to operate.

The foregoing outlines features of several embodiments so that those skilled in the art may better understand the aspects of the present disclosure. Those skilled in the art should appreciate that they may readily use the present invention as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A startup circuit, adapted to a switch-capacitor regulator comprising a capacitor, wherein the startup circuit is configured to initialize a voltage cross a top and a bottom of the capacitor to be a preset initial voltage, and the startup circuit comprises:
   a voltage forming circuit selectively electrically connected to the top and the bottom of the capacitor;
   a control unit, wherein in a first operation phase, the control unit controls the voltage forming circuit to electrically connect to the top and the bottom of the capacitor, and electrically connect the top of the capacitor to the bottom of the capacitor and set voltages of the top and the bottom of the capacitor to be the preset initial voltage, wherein in the second operation phase, the control unit controls the voltage forming circuit to disconnect the top of the capacitor from the bottom of the capacitor and generate a current flowing out from the bottom of the capacitor until the voltage cross the top and the bottom of the capacitor is equal to the preset initial voltage, wherein in a third operation phase, the control unit controls the voltage forming circuit to disconnect from the top and the bottom of the capacitor.

2. The startup circuit according to claim 1, wherein the voltage forming circuit comprises a first switch, a second switch, a third switch, a fourth switch, a voltage divider, a current mirror circuit and a current source, wherein the current source generates the current, the current mirror circuit is coupled to the current source and generates a mirrored current according to the current;
   wherein the voltage divider comprises a first terminal configured to receive a supply voltage, and a second terminal configured to output a divided voltage, and a third terminal electrically connected to a terminal of the fourth switch, and other terminal of the fourth switch is electrically connected to a low-voltage terminal;
   wherein the first switch has a terminal electrically connected to the top of the capacitor, and other terminal electrically connected to the second terminal of the voltage divider, and the third switch has a terminal electrically connected to the bottom of the capacitor, and other terminal electrically connected to the current mirror circuit;
   wherein the second switch has a terminal electrically connected to the top of the capacitor, and other terminal electrically connected to the bottom of the capacitor.

3. The startup circuit according to claim 2, wherein in the first operation phase, the control unit turns on the first switch, the second switch and the fourth switch, and turns off the third switch, so that the voltages of the top and the bottom of the capacitor are equal to the divided voltage.

4. The startup circuit according to claim 2, wherein in the second operation phase, the control unit turns on the first switch, the third switch and the fourth switch, and turns off the second switch, so that the mirrored current is flowed out from the bottom of the capacitor, to decrease the voltage of the bottom of the capacitor.

5. The startup circuit according to claim 2, wherein in the third operation phase, the control unit turns off the first switch, the second switch, the third switch and the fourth switch.

6. The startup circuit according to claim 1, further comprising a comparator circuit, wherein in the first operation phase, the comparator circuit receives the voltage of the top of the capacitor, and when the comparator circuit determine that the voltage of the top of the capacitor is higher than or equal to the preset high voltage, the comparator circuit outputs a first trigger signal to the control unit, and the control unit enters the second operation phase upon receipt of the first trigger signal.

7. The startup circuit according to claim 6, wherein in the second operation phase, the comparator circuit receives the voltage of the bottom of the capacitor, and when the comparator circuit determines that the voltage of the bottom of the capacitor is equal to a preset low voltage, the comparator circuit outputs a second trigger signal to the control unit, and the control unit enters the third operation phase upon receipt of the second trigger signal, wherein the preset initial voltage is equal to a voltage difference between the preset high voltage and the preset low voltage.

8. The startup circuit according to claim 6, further comprising a voltage detection circuit configured to compare a supply voltage and a voltage threshold, wherein when the supply voltage is higher than or equal to the voltage threshold, the voltage detection circuit outputs a power-stable signal to the comparator circuit, to trigger the comparator circuit to start comparing the voltage of the top of the capacitor and the preset high voltage.

9. The startup circuit according to claim 1, wherein the switch-capacitor regulator is a three-level buck convertor, and the three-level buck convertor comprises a balance circuit, and the voltage forming circuit comprise a fifth switch coupled between the balance circuit and the top of the capacitor, and in the first operation phase and the second operation phase, the control unit turns off the fifth switch, and in the third operation phase, the control unit turns on the fifth switch.

10. An operation method of a startup circuit, wherein the startup circuit is configured to initialize a voltage cross between the top and the bottom of the capacitor of a switch-capacitor regulator to be a preset initial voltage, and the operation method comprises:
electrically connecting the top of the capacitor to the bottom of the capacitor, and setting voltages of the top and the bottom of the capacitor to be a preset high voltage;
disconnecting the top of the capacitor from the bottom of the capacitor, and generating a current flowing out from the bottom of the capacitor;
determining whether the voltage cross the top of the capacitor and the bottom is equal to the preset initial voltage, wherein the preset initial voltage is equal to a voltage difference between the preset high voltage and the preset low voltage; and
when it is determined that the voltage cross the top of the capacitor and the bottom is equal to the preset initial voltage, stopping the current flowing out from the bottom of the capacitor, and activating the switch-capacitor regulator to operate.

11. The operation method according to claim 10, wherein the preset high voltage is a supply voltage of the switch-capacitor regulator, and the preset low voltage is a ground voltage, and before the step of determining whether the voltage cross the top of the capacitor and the bottom is equal to the preset initial voltage, the operation method comprises:
determining whether the supply voltage is stable; and
after the supply voltage is stable, starting to determine whether the voltage cross the top of the capacitor and the bottom is equal to the preset initial voltage.

12. The operation method according to claim 10, wherein the switch-capacitor regulator is a three-level buck convertor.

* * * * *